United States Patent [19]
Zolper

[11] Patent Number: 5,458,904
[45] Date of Patent: Oct. 17, 1995

[54] FAT SUBSTITUTES BASED ON CARRAGEENAN GELS, PROCESSES FOR PRODUCING THE SAME AND FOOD PRODUCTS CONTAINING THE FAT SUBSTITUTES

[76] Inventor: John T. Zolper, 125 E. Second St., New Castle, Del. 19720

[21] Appl. No.: 139,855

[22] Filed: Oct. 22, 1993

[51] Int. Cl.$^6$ .................... A23L 1/053; A23L 1/29
[52] U.S. Cl. .................... 426/96; 426/573; 426/575; 426/657; 426/804
[58] Field of Search .................... 426/573, 575, 426/567, 583, 96, 574, 804, 589, 656–657

[56] References Cited

U.S. PATENT DOCUMENTS

| | | | |
|---|---|---|---|
| 3,023,104 | 2/1962 | Battista | 99/1 |
| 4,734,287 | 3/1988 | Singer et al. | 426/41 |
| 4,855,156 | 8/1989 | Singer et al. | 426/565 |
| 4,911,946 | 3/1990 | Singer et al. | 426/658 |
| 4,961,953 | 10/1990 | Singer et al. | 426/656 |
| 4,985,270 | 1/1991 | Singer et al. | 426/515 |
| 5,096,730 | 3/1992 | Singer et al. | 426/583 |
| 5,096,731 | 3/1992 | Singer et al. | 426/583 |
| 5,098,728 | 3/1992 | Singer et al. | 426/579 |
| 5,102,681 | 4/1992 | Singer et al. | 426/589 |
| 5,104,674 | 4/1992 | Chen et al. | 426/573 |
| 5,139,811 | 8/1992 | Singer et al. | 426/589 |
| 5,143,741 | 9/1992 | Podolski et al. | 426/565 |
| 5,153,020 | 10/1992 | Singer et al. | 426/567 |
| 5,260,083 | 11/1993 | Brain et al. | 426/573 |
| 5,324,531 | 6/1994 | Hoefler et al. | 426/573 |

OTHER PUBLICATIONS

Introducing: A Wonder Product; publication by Carrageenan Company (date unknown).
Introductory Bulletin A–1; a publication by FMC, Marine Colloids (1991).
Dr. S. D. Upham, The Structure of Red Seaweed Polysaccharides, Colloid–O–Scope: Part I, vol. 12, No. 1 (1966); Part II, vol. 12, No. 2 (1966); Part III, vol. 13, No. 1 (1967).
The Wonder Powder; publication by Carrageenan Marketing Corp. (date unknown).

*Primary Examiner*—Jeanette Hunter
*Attorney, Agent, or Firm*—Connolly & Hutz

[57] ABSTRACT

The present invention relates to low-fat or fat-free substances which can be used as replacements for fat (i.e., fat substitutes or fat extenders), both per se as well as in the preparation of food products. Specifically, the present invention relates to gel systems which have been size reduced to mimic fat. The gel systems are based on gels which are produced from undenatured whole milk protein and carrageenan. These gels are broken and sized by shear to produce particles which are under two microns in size. Particles of this size are described as having a "fatty mouth feel" which means that the particles have a fat-like organoleptic character. The gel systems of the present invention may be used to replace some or all of the fats which are normally present in a variety of food products. The present invention also relates to processes for producing the fat substitutes and to food products containing the fat substitutes.

28 Claims, No Drawings

FAT SUBSTITUTES BASED ON CARRAGEENAN GELS, PROCESSES FOR PRODUCING THE SAME AND FOOD PRODUCTS CONTAINING THE FAT SUBSTITUTES

BACKGROUND OF THE INVENTION

The present invention relates to low-fat or fat-free substances which can be used as replacements for fat (i.e., fat substitutes or fat extenders), both per se as well as in the preparation of food products. Specifically, the present invention relates to gel systems which have been size reduced to mimic fat. The gel systems are based on gels which are produced from undenatured whole milk protein and carrageenan. These gels are broken and sized by shear to produce particles which are under two microns in size. Particles of this size are described as having a "fatty mouth feel" which means that the particles have a fat-like organoleptic character. The gel systems of the present invention may be used to replace some or all of the fats which are normally present in a variety of food products. The present invention also relates to processes for producing the fat substitutes and to food products containing the fat substitutes.

The reduction of fat consumption is an important dietary goal for most people. However, it is difficult to remove fat from many foods without reducing or eliminating the pleasurable "fatty mouth feel" associated with foods that contain fat. Accordingly, until recently, attempts to replace the fat in many foods with other substances, such as fibrous materials, has met with limited success because the replacement substances compromised the organoleptic character of the foods. Moreover, some of the fat replacement substances, such as sucrose polyesters, can cause distressing intestinal conditions and are therefore limited in their usefulness.

Recent efforts to create fat substitutes have been more successful. For example, U.S. Pat. No. 4,734,287 to Singer et al. discloses non-aggregated particles of denatured whey protein that have a substantially smooth emulsion-like organoleptic character and are used as a fat/cream substitute. The particles have a mean diameter particle size distribution in a dried state ranging from about 0.1 microns to about 2.0 microns, with less than about 2 percent of the total number of particles exceeding 3.0 microns in diameter. The fat substitutes disclosed by Singer et al. cannot be used in prolonged high temperature applications, i.e., frying, broiling, baking, because the whey protein particles will massively agglomerate thereby losing the emulsion-like character.

U.S. Pat. No. 4,911,946 to Singer et al. discloses a fat substitute which comprises water-dispersible macro-colloid particles having a substantially spheroidal shape and a particle size distribution effective to impart the substantially smooth organoleptic character of an oil-and-water emulsion. The particles are composed of carbohydrate material.

U.S. Pat. No. 4,961,953 to Singer et al. discloses proteinaceous, water-dispersible macrocolloids which in a hydrated state have a substantially smooth, emulsion-like, organoleptic character. The macrocolloids may be produced from a variety of substantially soluble undenatured protein starting materials by controlled heat denaturation under high shear conditions.

In addition to the above patents, U.S. Pat. Nos. 4,855,156; 4,985,270; 5,096,730; 5,096,731; 5,098,728; 5,102,681; 5,139,811; and 5,153,020 all in the names of Singer et al., disclose various food products containing fat substitutes and methods of producing such food products.

U.S. Pat. No. 3,023,104 to Battista discloses reduced calorie food compositions comprising a food material and, as a no-nutritive agent, cellulose crystallite aggregates, the latter comprising a product of the acid hydrolysis of cellulose. The aggregates are disclosed as having a particle size of from less than 1 to about 250 or 300 microns. It is also disclosed in Battista that in some cases it is desirable to incorporate with the crystallite aggregates a small amount of a protective colloid to vary the texture or mouth feel of the resulting mix or food product. Carrageenan is disclosed as an example of such a colloid.

U.S. Pat. No. 5,143,741 to Podolski et al. discloses a fat substitute which can be employed in food products. The fat substitute consists essentially of substantially non-aggregated casein micelles and can be used to replace all or a portion of the fat or cream in food products having a pH greater than about 5.6. The pH limitation is necessary because in food products having a pH under about 5.6 the casein micelles will aggregate to form cheese.

All of the aforementioned patents are expressly incorporated herein and made a part of the present patent application.

The present invention is based on the unexpected discovery that gel systems that are based on gels which are produced from undenatured whole milk protein and carrageenan can be used as fat substitutes in food products under a wide range of temperature and pH conditions.

SUMMARY OF THE INVENTION

The present invention relates to fat-free substances which can be used as replacements for fat (i.e., fat substitutes or fat extenders), both per se as well as in the preparation of food products. Specifically, the present invention relates to gel systems which have been size reduced to mimic fat. The gel systems are based on gels which are produced from undenatured whole milk protein and carrageenan. These gels are broken and sized by shear to produce particles which are under two microns in size. Particles of this size are described as having a "fatty mouth feel" which means that the particles have a fat-like organoleptic character. The gel systems of the present invention may be used to replace some or all of the fats which are normally present in a variety of food products. The present invention also relates to processes for producing the fat substitutes and to food products containing the fat substitutes.

There are several gel systems that can be used in the present invention. Each of the gel systems is based on a gel formed from carrageenan. Carrageenan is a generic term applied to hydrocolloids extracted from a number of closely related species of red seaweed. Carrageenan is generally classified as a high molecular weight linear polysaccharide made up of repeating galactose units, and 3,6 anhydrogalactose, both sulfated and nonsulfated, joined by alternating alpha 1–3, beta 1–4 glycosidic linkages. There are three types of carrageenan, kappa, iota and lambda. The individual properties of each type of carrageenan primarily result from the number and position of the ester sulfate groups on the repeating galactose units. It is known that carrageenan and whole milk protein form thermally reversible gels. The interaction between the casein micelle in milk protein and carrageenan at pH conditions in the 6–7 range is based on the high concentration of negative charges which are located on portions of the surface of the casein micelle. These negative charges are coupled by a divalent cation such as $Ca^{++}$ with the negative charges of the carrageenan. This attraction can increase the gel strength to about 10 times the gel strength of carrageenan alone and water. Because of these above interactions, all three types of carrageenan can be used to form gels with milk protein. It is also possible to improve the gel strength of kappa and/or iota carrageenans in solutions containing milk protein (e.g., raw animal milk) by adding additional cations such as potassium and/or calcium to the solution. The use of these cations will also increase the temperature at which kappa and iota carrageenan go into solution; increase the gelation temperature of kappa and iota carrageenan-milk protein gels; and increase the remelt temperature of kappa and iota carrageenan-milk protein gels.

In addition to the above-discussed properties of carrageenan, it is also known that an interaction occurs between kappa carrageenan, locust bean gum and undenatured whole milk protein which results in an increase in strength and elasticity of gels formed from kappa carrageenan and undenatured whole milk protein. Moreover, the interaction between kappa carrageenan, locust bean gum and undenatured whole milk protein results in gels that have decreased syneresis. Syneresis is the separation of liquid (e.g., water) from a gel and is caused by contraction. Kappa carrageenan-undenatured whole milk protein gels normally display some syneresis whereas iota carrageenan-undenatured whole milk protein gels and to a lesser extent lambda-undenatured whole milk protein gels are free from syneresis.

DESCRIPTION OF THE PREFERRED EMBODIMENTS

As stated above, there are several gel systems that can be used to form the fat substitutes of the present invention. Each of the gel systems is based on a gel formed from a specific carrageenan (kappa, iota or lambda) and whole milk protein. The whole milk protein contains both the whey portion and the casein portion and can be obtained by using undenatured whole milk (i.e., animal milk in raw form or pasteurized through heat treatment as long as the protein is not denatured to a significant extent during the heat treatment) or by using undenatured, defatted whole milk protein or by using mixtures of the two. The following embodiments of the present invention demonstrate the use of several preferred gel systems that may be used to form the fat substitutes of the present invention. Although these embodiments represent the preferred embodiments of the present invention, it may be possible to use combinations and/or variants of these embodiments to form fat substitutes having equivalent properties and such combinations and/or variants should be viewed as being a part of the present invention.

The term "fat substitute" or "fat extender" refers to substances that are used as replacements for fat in products that are to be taken internally into an animal's (e.g., a human being's) body. Such substances are distinguished from "carrier materials" which are used to carry substances (e.g., medicaments) that are to be applied to the external parts of an animal's body. In certain situations, the fat substitutes or fat extenders of the present invention may be used in products that did not previously contain any fatty substances, if such use is desirable for that product application.

The first embodiment of the present invention is a fat substitute comprising a gel formed from undenatured, defatted whole milk protein and kappa carrageenan. The gel is broken and sized by shear to create particles under 2 microns. More particularly, the particles have a mean diameter particle size distribution in a dried state ranging from about 0.1 microns to about 2.0 microns, with less than about 2 percent of the total number of particles exceeding 3.0 microns in diameter. The fat substitute formed from this gel has a "fatty mouth feel". It is possible, and in some situations preferable, to use locust bean gum during the formation of the gel.

The gel of the first embodiment of the present invention can be formed by the following process. First, the kappa carrageenan and the locust bean gum (if used) are mixed with water at ambient temperature until they are dispersed therein. The kappa carrageenan is added to the water in an amount of about 0.5 to 5.0% by weight based on the weight of the water. The locust bean gum (if used) is added in an amount of up to about 50% by weight based on the weight of the kappa carrageenan. Second, the water is heated to a temperature (e.g., about 130°–185° F.) that is sufficient to cause the kappa carrageenan and locust bean gum to dissolve into the water. Third, the water solution is removed from heat and the above-described milk protein, preferably in dry form, is added to the hot (e.g., about 130°–185° F.) solution. During the addition of the milk protein, as well as throughout the entire process, the solution is continuously stirred. The milk protein is the whole milk protein which means that it contains both the whey portion and the casein portion. The addition of the milk protein causes a drop in the temperature of the solution to about 170° F. Fourth, the heated cation(s) are added to the heated solution. The cation(s) may be supplied in the form of a water slurry of a salt(s) containing the cation(s). The slurry should be preheated to a temperature which is approximately the same as the solution temperature. For example, a slurry of about 10–15% by weight salt (e.g., predominantly potassium chloride) in water could be preheated and added to the above-described solution to bring the salt concentration in the solution to about 1–2% by weight based on the weight of the water. It is possible to reverse the order of the third and fourth steps if desired, as long as the temperature is kept above the set point of the gel. Fifth, the solution is cooled to about ambient temperature while maintaining constant stirring. The cooling of the mixture can be accomplished by any means. For example, cold water (e.g., about 40°–50° F.) can be brought into contact with the outside of the container holding the solution. As the solution cools it begins to gel at a temperature of about 115°–170° F., depending at least partially on the amount of cation present in the solution. Sixth, when the temperature of the gel stabilizes, the gel is subjected to shear which is sufficient to create the particles described above (i.e., particles having a mean diameter particle size distribution in a dried state ranging from about 0.1 microns to about 2.0 microns, with less than about 2 percent of the total number of particles exceeding 3.0 microns in diameter). Although the gel can be subjected to shear at any temperature below the gelling temperature, as long as the temperature of the gel during shearing does not rise above the gel's melt temperature, in most situations it is convenient to conduct the shearing step at or near ambient temperature. The shear can be created, for example, by circulating the gel from the container to a pump which forces the gel through a nozzle which delivers the broken (sheared) gel back to the container and continuing this circulation until the desired particle size range is achieved. For faster results the broken gel could be held in a second surge tank for further shearing rather than returning it to the original tank.

At least one carbohydrate (e.g., sugars, edible polyols (sorbitol, glycerine etc.), etc.) may be added to the first embodiment at levels up to 65% (preferably 1–65%) with advantage. Usually the carbohydrate(s) would be blended with the carrageenan and added to the water with the carrageenan (i.e. in the first step).

The presence of the at least one carbohydrate helps to decrease the amount of salt which must be added to the solution by decreasing the amount of water present in the solution (i.e., when compared to a solution that does not contain any soluble carbohydrates).

Moreover, in general, the presence of carbohydrate in a fat substitute also helps to reduce syneresis, add to the product's nutrition, raise the atmospheric boiling temperature (especially useful in the fat substitutes containing iota carrageenan) and contributes to freeze-thaw stability. Moreover, high levels of carbohydrate will contribute to the microbiological stability of the fat substitute. Also, carbohydrates aid in the rehydration of dried fat substitutes.

The second embodiment of the present invention is a fat substitute comprising a gel formed from undenatured, defatted whole milk protein and a combination of kappa and iota carrageenan. The gel is broken and sized by shear to create particles under 2 microns. More particularly, the particles have a mean diameter particle size distribution in a dried state ranging from about 0.1 microns to about 2.0 microns, with less than about 2 percent of the total number of particles exceeding 3.0 microns in diameter. The fat substitute formed from this gel has a "fatty mouth feel". It is possible, and in some situations preferable, to use locust bean gum during the formation of the gel.

The process for forming the gel of the second embodiment of the present invention is the same as the process for forming the gel of the first embodiment except that a mixture of kappa and iota carrageenan is used and the temperature to which the water is heated in the second step may be slightly higher (e.g., about 130°–210° F. depending on the amount of iota carrageenan and calcium cation in the mixture). When carbohydrates are used in the second embodiment, preferred amounts are about 5–35% (based on the water) and the carbohydrates may be added in the same manner as the first embodiment.

The third embodiment of the present invention is a fat substitute comprising a gel formed from undenatured, defatted whole milk protein and iota carrageenan. The addition of at least one carbohydrate at a 1–35% level (based on the water) can be made with the same advantage found with such additions in the first embodiment. The gel is broken and sized by shear to create particles under 2 microns. More particularly, the particles have a mean diameter particle size distribution in a dried state ranging from about 0.1 microns to about 2.0 microns, with less than about 2 percent of the total number of particles exceeding 3.0 microns in diameter. The fat substitute formed from this gel has a "fatty mouth feel".

The gel of the third embodiment of the present invention can be formed by the following process. First, the iota carrageenan is dry blended with the carbohydrate (if used) and mixed with water at ambient temperature until it is dispersed therein. Second, the water is heated to a temperature (e.g., about 130°–210° F.) that is sufficient to cause the iota carrageenan to dissolve into the water. Third, the above-described milk protein, preferably in dry form, is added to the hot (e.g., about 130°–210° F.) solution while the temperature is maintained. Fourth, the cation(s) are added to the heated solution with good agitation. Both the heated solution and the cation slurry should be at a high enough temperature so that gelation does not immediately occur upon the cation addition. The cation(s) may be supplied in the form of a water slurry of a salt(s) containing the cation(s). The slurry should be preheated to a temperature which is approximately the same as the solution temperature. For example, a slurry of about 10–15% by weight salt (e.g., predominantly calcium chloride) in water could be preheated and added to the above-described solution to bring the salt concentration in the solution to about 0.5–3% by weight based on the weight of the water. During the addition of the milk protein in the third step, as well as throughout the entire process, the solution is continuously stirred. The milk protein is the whole milk protein which means that it contains both the whey portion and the casein portion. It is also desirable that the third and fourth steps be carried out as quickly as possible to minimize the denaturation of the milk protein. It is possible to reverse the order of the third and fourth steps if desired, as long as the temperature is kept above the set point of the gel. Fifth, the solution is cooled to about ambient temperature while maintaining constant stirring. The cooling of the mixture can be accomplished by any means. For example, cold water (e.g., about 40°–50° F.) can be brought into contact with the outside of the container holding the solution. As the solution cools it begins to gel at a temperature of about 130°–205° F., depending at least partially on the amount of cation present in the solution. Sixth, when the temperature of the gel stabilizes, the gel is subjected to shear which is sufficient to create the particles described above (i.e., particles having a mean diameter particle size distribution in a dried state ranging from about 0.1 microns to about 2.0 microns, with less than about 2 percent of the total number of particles exceeding 3.0 microns in diameter). Although the gel can be subjected to shear at any temperature below the gelling temperature, as long as the temperature of the gel during shearing does not rise above the melt temperature of the gel, in most situations it is convenient to conduct the shearing step at or near ambient temperature. The shear can be created, for example, by circulating the gel from the container to a pump which forces the gel through a nozzle which delivers the broken (sheared) gel back to the container and continuing this circulation until the desired particle size range is achieved.

The fourth embodiment of the present invention is a fat substitute comprising a gel formed from undenatured, defatted whole milk protein and lambda carrageenan. The gel is broken and sized by shear to create particles under 2 microns. More particularly, the particles have a mean diameter particle size distribution in a dried state ranging from about 0.1 microns to about 2.0 microns, with less than about 2 percent of the total number of particles exceeding 3.0 microns in diameter. The fat substitute formed from this gel has a "fatty mouth feel".

The gel of the fourth embodiment of the present invention can be formed by a process which is substantially identical to the process of forming the gels of the first to third embodiments of the present invention. Although carbohydrate additions up to 65% (preferably 1–65%) can be useful, there is no need to use locust bean gum or cations with lambda carrageenan. Moreover, the lambda carrageenan and the milk protein (with the carbohydrate, if used) can be added to the water and dispersed therein at ambient temperature (i.e., before the water is heated in the second step). After these components have been dispersed in the water, the water is heated to a temperature of about 100°–140° F. and then cooled. The solution will start to gel at about 100° F. and can be subjected to shear at any temperature below the gelling temperature (but preferably below 50° F.) as long as the temperature of the gel during shearing does not rise above the gelling temperature.

As discussed above in several of the embodiments of the present invention, cations are used with kappa carrageenan-whole milk protein and iota carrageenan-whole milk protein gels to modify the properties of the gels. It is generally known that potassium ions have a beneficial effect on the kappa system and that calcium ions have a beneficial effect on the iota system. In many situations, it is beneficial to use a combination of cations with either system. For example, several salts could be added to a solution containing at least one of kappa carrageenan and iota carrageenan in water. In particular, a combination of a potassium salt and a calcium salt (predominantly potassium salt) can be advantageously used with the kappa carrageenan system. Moreover, a combination of a calcium salt and a potassium salt (predominantly calcium salt) can be used with the iota carrageenan system. When a mixture of kappa and iota carrageenan undenatured whole milk protein gels is used, the ratio of calcium salts to potassium salts will depend upon the ratio of iota carrageenan to kappa carrageenan. When kappa carrageenan is the predominant form of carrageenan present, the salt(s) used should be predominantly potassium salts. When iota carrageenan is the predominant form of carrageenan present, the salt(s) used should be predominantly calcium salts.

In certain situations it can be desirable to use a blocking solution with the gel to form the fat substitute. The blocking solution is useful in keeping the small gel particles separated and in helping to prevent or limit aggregation of the gel particles. Suitable blocking solutions comprise at least one of soluble carbohydrates (e.g., malto-dextrin and lactose) and non-gelling gums (e.g., xanthan gum) which are dissolved in water. The concentration of the soluble carbohydrates in the blocking solution can be up to about 60% by weight based on the weight of the water in the blocking solution. The gum level can be up to about 5% by weight based on the weight of the water in the blocking solution. The blocking solution is added to the gel after the gel formation is complete and usually before the shearing step in an amount of about 15–40% by weight, preferably 15–25% by weight, based on the final weight of the gel/blocking solution mixture. It is desirable for the blocking solution to contain as little water as possible because any excess water in the final gel/blocking solution mixture may be picked up by some of the gel particles causing those particles to swell to sizes that are outside of the range of the present invention. The use of non-gelling gums in the blocking solution is desirable because the gums increase the viscosity of the blocking solution which helps to immobilize both the gel particles and any excess water molecules that may be present in the final gel/blocking solution mixture. It is always desirable to adjust the composition of the blocking solution so that any water transfer occurs from the gel to the blocking solution rather than from the blocking solution to the gel. Oils can be used very effectively as blocking agents in amounts of about 15–40% by weight, preferably 15–25% by weight, based on the final weight of the gel/oil mixture. Of course, if oil is used as a blocking agent, the end product would only be fat reduced rather than no-fat (or fat-free). Moreover, at least one edible polyol (e.g., sorbitol, glycerine, etc) can be used to advantage as a blocking agent.

The fat substitutes of the present invention comprising a gel formed from undenatured whole milk protein and carrageenan can have a ratio of milk protein to carrageenan of up to about 100 to 1 and as low as 0.5 to 1. Preferably, the ratio of milk protein to carrageenan is in the range of from about 7 to 1 to about 30 to 1. The most desirable ratio of milk protein to carrageenan is in the range of from about 7 to 1 to about 12 to 1. The amount of carrageenan in these fat substitutes is generally about 0.1 to 3.5% by weight carrageenan based on the total weight of the fat substitute.

As discussed above, any of the fat substitutes of the present invention can contain soluble carbohydrates. At least a portion of these soluble carbohydrates are contained within the gel particles and this arrangement can help to limit or prevent the transfer of water from the fat substitute into the food product. The carbohydrates help reduce syneresis and aid in freeze-thaw stability. In iota carrageenan-milk protein gels the melt temperature can be adjusted to over 212° F. (at atmospheric pressure) by including soluble carbohydrates.

The undenatured whole milk protein that is used in the present invention may be supplied in dry form (e.g., as a powder) or in a liquid form (e.g., as a concentrated water slurry or even as undenatured raw animal milk, undenatured pasteurized animal milk or undenatured defatted animal milk). As described above, the term "whole milk protein" means that both the casein portion and the whey portion of the milk protein are present. In the process of the present invention the casein portion of the milk protein interacts with the carrageenan to form a gel which will contain (i.e., encapsulate or enclose) the whey portion of the milk protein. More particularly, it is believed that the casein micelles in the milk protein, which have a strong negative charge on portions of their surface, interact with the carrageenan, which has a negative charge, by cobinding through a divalent cation such as $Ca^{++}$ (calcium) to increase the gel strength of the carrageenan. The whey portion of the milk protein does not significantly interact or react with the carrageenan and becomes encapsulated or enclosed within the carrageenan gel during the gelling stage.

The term "undenatured" is used in the present disclosure to describe a milk (e.g., animal milk), in liquid or dried form, wherein the proteins are water soluble and further wherein the casein micelles are intact or have not significantly degraded. Since the casein micelles will degrade when exposed to heat, it is desirable to limit the amount of time that the milk (or milk protein) is exposed to heat during the original processing of the milk and during the formation of the gel of the present invention. A preferred milk for use in the process of the present invention is defatted ultra-filtered, low heat spray dried milk. This type of milk has the advantage of containing a reduced amount of lactose in the milk solids, thus increasing the relative concentration of the milk proteins in the milk solids, especially the desirable casein micelle portion of the milk solids. Moreover, this type of milk may be processed without exposure to heat for any significant amount of time and thus the casein micelles are in good condition.

It should be noted that the temperatures to which the carrageenan/water or carrageenan/water/milk protein mixtures are heated before gelling, indicated in the descriptions of the first through fourth embodiments of the present invention, relate to processes that occur at atmospheric pressure. If it is desired to operate at higher temperatures, the pressure of the system can be increased to above one atmosphere. In this manner, the system can be operated at higher temperatures as long as the higher temperatures do not result in any significant degradation of the milk protein. The amount and/or extent of degradation can be controlled by limiting the amount of time that the mixtures are exposed to the elevated temperatures.

An important advantage of the fat substitutes of the present invention that are produced with carrageenan and milk protein is that the fat substitutes can be used in food products with a wide range of pH values. Normally, casein micelles will aggregate and lose their "fatty mouth feel" at pH values below about 5.1. Accordingly, the fat substitutes of the prior art that contain casein micelles have generally been limited to use in food products having a pH that is greater than about 5.1. However, the novel fat substitutes of the present invention that contain casein micelles (i.e., fat substitutes that are produced with carrageenan and milk protein) can be used in food products that have pH values that are significantly below 5.1. For example, the fat substitutes of the present invention that contain casein micelles can be used in food products having pH values as low as 2.5. However, lower pH's may present shelf life stability considerations. Therefore, pH's around 3.5 or above are preferred when shelf-life is a consideration. This permits these fat substitutes to be used in food products such as mayonnaise and salad dressings which normally have pH values which are too low for the prior art fat substitutes that contain casein micelies. Without wishing to be bound by any theory of how or why the fat substitutes of the present invention can withstand such low pH values, it is believed that in the present fat substitutes the aggregation of the casein micelles at pH values below 5.1 is prevented or significantly reduced by three factors. The first factor is that the casein micelles are attached to the carrageenan and thus do not exist to any significant extent as individual casein micelies. The second factor is that the blocking solution helps to prevent the aggregation of the gel particles and thus it is difficult for the casein micelles in one gel particle to contact the casein micelles in another gel particle. The third factor is that the gel particles of the present fat substitutes are so small that any aggregation that may occur is insufficient to cause the fat substitute to lose its "fatty mouth feel" (i.e., the aggregation which may occur does not create an organoleptically significant number of large particles which are outside of the range discussed earlier in this disclosure).

The fat substitutes of the present invention are also stable at a wide range of temperatures. Moreover, the use of cations during the formation of the particular gel in some of the fat substitutes can increase the temperature at which the fat substitute produced from that gel can be used. Also, the lower pH versions of these protein containing fat substitutes (i.e., under pH 4.7) show increased tolerance to higher temperatures. The following table indicates the temperature ranges in which each fat substitute of the present invention can be utilized.

TABLE 1

Approximate Stable Reheat Temperature Ranges
From 33° F. To Temperature Listed Below in °F.

| The Fat Substitute of Embodiment | When the Form of Fat Substitute is: | | | |
|---|---|---|---|---|
| | A* | B** | C*** | D**** |
| #1***** | 100–140* | 160–165 | 175 | 190 |
| #2***** | 100–140* | 200 | 200 | 212 |
| #3***** | 100–140* | 220 | 220 | 220 |
| #4 | 100–110 | 110 | 140 | 145 |

*A: neutral pH (>5.6), as is, with low viscosity or no blocking agent and no added cations
**B: same as A with maximum added cations (calcium and/or potassium) to obtain maximum melt points.
***C: same as B, but with a high viscosity (i.e., 3% xanthan) blocking agent and/or high viscosity finished product (for example cheddar cheese type)

TABLE 1-continued

Approximate Stable Reheat Temperature Ranges
From 33° F. To Temperature Listed Below in °F.

| The Fat Substitute of Embodiment | When the Form of Fat Substitute is: | | | |
|---|---|---|---|---|
| | A* | B** | C*** | D**** |

****D: same as C, but with a low pH (below 5)
*****dependent on the cation balance and quantity in the commercial carrageenan used.

The carrageenan-milk protein systems are thermally reversible. The systems have a melt point and a set point. Because of hysteresis the set point is a lower temperature than the melt point. Potassium ion will increase the melt temperatures of the kappa carrageenan-milk protein system up to about 167° F. Calcium ion will increase the melt temperature of the iota carrageenan-milk protein system to over 212° F., but the high temperature incurred will tend to denature the milk protein and diminish the synergistic interaction between the carrageenan and the protein. The hysteresis of these systems help facilitate their preparation.

Cation levels do not appreciably effect melt points of lambda-carrageenan milk protein gels, but as also applies to the other carrageenan-milk protein systems, once the micro sized broken gel is formed, high viscosity blocking agents (such as xanthan) tend to protect the broken gel system from forming aggregates and thus lose their "fatty mouth feel" at temperatures higher than the melt point of the fat substitute. Once the fat substitute is incorporated into finished foods which have limited mobility at high temperatures the food itself gives protection against aggregation. For example, a cheese in which a kappa carrageenan-milk protein based fat substitute is incorporated (melting and/or aggregation temperature of 167° F.) is stable at 185° F. and higher.

Again, once the micro sized broken gel is formed, the lowering of the pH to the high 4's of the milk protein containing fat substitutes will destroy their thermal reversibility and thus reduce the tendency to aggregate at high temperatures and protect their "fatty mouth feel" character.

Examples of food products in which the fat substitutes of the present invention can be used include:

1. Frozen desserts
2. Dairy based spreads
  a. butter type
  b. cream cheese
  c. dips
3. Mayonnaise and other salad dressings
4. Low fat ground and emulsion meats
5. Candy and icing
6. No fat coffee creamer
7. Low fat milk
8. No fat cheese
9. No fat whipped topping
10. Bakery items
  a. cheese cake
  b. cake The fat substitutes of the present invention can be used immediately after production or they can be dried by any convenient means that does not cause the gel to exceed its melt temperature. The preferred drying method is low heat spray drying. The dried version of the fat substitute has the advantages of increased shelf life because of the lack of microbiological degradation. On the other hand, the dried versions must be rehydrated in warm to hot water before use unless the finished product production procedure provides for such heated hydration. The inclusion of carbohydrates and other water soluble materials in the fat substitute formulation assists in a more rapid rehydration or swelling at lower temperatures.

The particle size of the gel during shearing can be measured by any technique known in the art, such as the techniques described in U.S. Pat. No. 4,734,287. Moreover, the organoleptic character of the sheared gel will provide an indication of when the appropriate gel particle size has been reached. For example, the sheared gel will have a "fatty mouth feel" in the particle size range discussed earlier in this disclosure.

The fat substitute of the present invention can be added in virtually any amount to a particular food product (e.g., from 0.01%–100% by weight of the final food product). It is desirable to add the hydrated fat substitute to the food product in an amount on a pound for pound basis which is sufficient to replace all or a significant portion of the fat contained within the food product. For many foods, this amount is in the range of from about 1%–50% by weight. However, to replace the fat in certain high-fat foods, the fat substitute is added in an amount of from about 50–95% by weight of the final food product. For food products with very high fat contents, a preferred range for the amount of fat substitute to be used is from about 75–100% by weight.

The following examples illustrate the practice of the present invention but should not be construed as limiting its scope.

EXAMPLES

EXAMPLE 1

| Fat Substitute #1 | | |
|---|---|---|
| A | | % |
| (i) | Milk Pro 750* (low lactose NFDM) | 15.00 |
| (ii) | Sugar | 5.00 |
| | Gelcarin GP911 (a predominantly kappa carrageenan) | 0.80 |
| | Locust Bean Gum | 0.40 |
| | Guar | 0.15 |
| (iii) | KCl | 1.58 |
| | H$_2$O | 10.00 |
| (iv) | H$_2$O | 67.07 |
| | | 100.00 |
| B Blocking Agent | | % |
| (i) | Malto Dextrin (10DE) | 50.00 |
| | Xanthan | 2.00 |
| (ii) | H$_2$O | 48.00 |
| | | 100.00 |

*Product of American Dairy Specialties, Burlington, N.J.

Procedure:

For A:
1. Dry blend (ii) and mix with cold (iv).
2. Heat mixture of (ii) and (iv) to 180° F. and hold at 180°–185° F. for 20–30 minutes.
3. Add (i) while maintaining 170° F. temperature.
4. Heat (iii) to 170° F. and add to mixture of (i), (ii) and (iv) to form A.
5. Cool A to 40°–50° F.

For B:
1. Dry blend (i) and at room temperature add (ii) with agitation to form B.
2. Cool B to 40°–50° F.

To form Fat Substitute #1:

Mix 4 parts A with one part B and shear using maximum speed in a household blender while keeping the temperature of A,B mixture below 60° F. through alternating about 2 minutes of shearing with ½ hour of freezer storage until a "fatty mouth feel" is developed and microscopic observation shows a predominance of 2 micron and less sized particles. Six to eight cycles of 2 minute shearings alternated with ½ hour freezer storages is usually required to obtain the proper effect.

An alternate and preferable procedure would be to pump the A,B mixture through a spray nozzle (with recycling) while maintaining a low temperature until the proper mouth feel is obtained. It may be necessary to recycle the A, B mixture through the spray nozzle several times to obtain gel particles that are small enough to produce the desirable "fatty mouth feel". In this spray nozzle procedure, cooling can be continuously applied which will allow for a higher temperature than the blender procedure (maximum blender procedure temperature about 60° F.), since the cool mass at the shear point will dampen local or micro temperature increases.

The hydrated Fat Substitute #1 may be spray dried satisfactorily if all product temperatures are kept below 165° F. to produce Fat Substitute #1 SD (spray dried).

EXAMPLE 2

Frozen Dessert

A very rich and pleasing ice-cream type no-fat frozen dessert is obtained by using the above Fat Substitute #1 in the following recipe:

| | Parts by Weight |
|---|---|
| Sugar and Corn Sugar Solids | 17.5 |
| non-fat dry milk | 12.0 |
| Fat Substitutes #1 | 15.0 |
| Stabilizer (CMC/Guar) | 0.09 |
| H$_2$O | 55.41 |
| Flavor | q.s. (quantum sufficit- as much as suffices) |

The above mix is agitated with good shear and pasteurized at 160° F. for ten minutes. Higher temperatures should be avoided, since the fat substitute may lose its necessary small particle size.

Texture of the finished frozen dessert can be varied by reducing the xanthan in the blocking agent to 0.5% and increasing the malto dextrin to 65–70%. In this case, the amount of stabilizer in the frozen dessert can be increased to 0.15 parts by weight.

About 4 to 8% by weight of products such as Litesse (Pfizer & Co.), can be added to the frozen dessert if added body and a higher melting temperature are desired.

EXAMPLE 3

Whipped Topping

No-fat protein whipped toppings may be "mouth feel" enhanced by the use of Fat Substitute #1. One example is:

|  | Parts by Weight |
|---|---|
| a) Milk Pro 750 | 10.00 |
| b) Viscarin GP109* | 0.2 |
| c) Sugar | 5.0 |
| d) vanilla | q.s. |
| e) Water (cold) | 84.8 |

*(a predominately lambda carrageenan Product of FMC Corp.)

The whipped topping is formed by dry mixing a), b) & c) and then dispersing the mixture into d) & e). This dispersion is then whipped for 3 minutes before cold Fat Substitute #1 is added in any desired quantity (for example, 30 parts of Fat Substitute #1 to 70 parts of the dispersion). After the Fat Substitute #1 has been added to the dispersion to form the final mixture, this mixture is whipped for about 15 seconds to form the whipped topping.

EXAMPLE 4

No and/or Low Fat Ricotta, and No and/or Low Fat Cottage Cheese

Adjust the pH of Fat Substitute #1 with lactic acid (88% solution in water) to match the pH of the cheese. Add any quantity of Fat Substitute #1 desired (for example 20 parts of Fat Substitute #1 to 80 parts cheese). Stir in Fat Substitute #1 until dispersed in the cheese.

EXAMPLE 5

No-Fat Coffee Whiteners and Skimmed Milk Enhancers

Fat Substitute #1 may be used to advantage in no-fat coffee whiteners at a 10–14% level and in skimmed milk at about 4%. Products should be homogenized for better stability results.

EXAMPLE 6

No-Fat Cream Cake

1. Beat 4 egg whites with ¼ cup sugar until stiff and set aside.

2. Beat ⅝ cup sugar, ¾ cup water, 3 tbsp (about 15 gms) dry Fat Substitute #1 SD (Spray Dried), 1 teaspoon vanilla and color q.s.

3. Mix and sift 1 ⅔ cups cake flour, 2 ½ teaspoons baking powder and ½ teaspoon of salt.

4. Stir #2 into #3.

5. Stir #1 into #4.

Lightly spray two 8 inch layer cake pans and bake at 325° F. for about 25–30 minutes.

EXAMPLE 7

No-Fat Cake

The no-fat cake produced in this Example used the following fat substitute.

| Fat Substitute #1(a) | | | |
|---|---|---|---|
| A | % | B Blocking Agent | % |
| (i) Land O' Lakes (low temperature NFDM) | 30.00 | (i) Malto Dextrin (10DE) | 50.00 |
|  |  | Xanthan | 2.00 |
| (ii) Gelcarin GP911 | 0.80 | (ii) H$_2$O | 48.00 |
| Locust Bean Gum | 0.40 |  | 100.00 |
| Guar | 0.15 |  |  |
| (iii) KCl | 1.25 |  |  |
| H$_2$O | 10.00 |  |  |
| (iv) H$_2$O | 57.40 |  |  |
|  | 100.00 |  |  |

Procedure:

Fat Substitute #1(a) is produced by the same procedure as Fat Substitute #1.

Procedure for forming No-Fat cake.

1. Blend 2 eggs (about 120 grams), about 180 grams of sugar, vanilla (1 teaspoon or q.s.), about 150 grams of water, about 50–300 grams of Fat Substitute #1(a) (pH adjusted to about 5) and orange peel (q.s.) thoroughly until a rich foamed batter is obtained.

2. Sift about 240 grams of cake flour, about 9 grams of baking powder (about 2.5 teaspoons) and about 2 grams of salt (about ½ teaspoon).

3. Fold the sifted ingredients from (2) into the batter from (1) until a uniform mixture is obtained.

4. Place the mixture from (3) into a baking pan and bake at 310°–315° F. for about 1–1.5 hours.

5. Remove the baking pan from heat and allow to cool.

6. Wrap resulting cake (after cooling) and store overnight.

The amount of water used in this cake will be from about 100–150 grams, depending on how much Fat Substitute #1(a) is used. If about 50 grams of Fat Substitute #1(a) is used, the amount of water used will be about 100 grams. If about 300 grams of Fat Substitute #1(a) is used, the amount of water used will be about 150 grams.

EXAMPLE 8

| Fat Substitute #2 | |
|---|---|
|  | % |
| A. Potassium Sorbate | 0.30 |
| Sodium Citrate | 0.13 |
| Milk Pro 750 | 13.00 |
| Viscarin GP209 (predominately lamba carrageenan) | 1.20 |
| Sugar | 5.00 |
| Water | 80.37 |
| Total | 100.00 |
| B. Blocking Agent |  |
| Potassium Sorbate | 0.30 |
| Xanthan | 5.00 |
| Water | 94.70 |

-continued

| Fat Substitute #2 | |
|---|---|
| | % |
| | 100.00 |

Procedure:
1. Blend A's dry ingredients and then add the water in A and blend to form a mixture. Heat the mixture to 155° F. and then cool the mixture to 40° F. to form A.
2. Blend B's dry ingredients and then add the water in B and blend to form B.
3. Mix about 5 parts of A with about 1 part of B and shear using procedure for Fat Replacement #1.

EXAMPLE 9

| No-fat Mayonnaise-type Dressing | |
|---|---|
| | % |
| Acid Mix | |
| Citric acid | 20.00 |
| Lactic acid (88% aqueous solution) | 20.00 |
| White Wine | 30.00 |
| Water | 30.00 |
| | 100.00 |
| Flavor Mix | |
| Honey | 25.00 |
| Mustard | 75.00 |
| | 100.00 |

Procedure for forming dressing:
1. Mix Flavor Mix ingredients together to form a mixture.
2. Add about 1 part of the mixture from (1) to about 37.5 parts of the Fat Substitute #2 and mix thoroughly to form a mixture.
3. Mix together the ingredients of the Acid Mix to form a mixture.
4. Add a sufficient amount of the mixture from (3) (cold) to the mixture of (2) (cold) to reduce the pH to about 4.2.
5. Stir in other spices (q.s.).

Fat Substitute #2 may be added to cheeses such as cottage and Ricotta if the pH is adjusted to the pH of the cheese. The acid used to adjust the pH of Fat Substitute #2 is lactic acid (88% aqueous solution). Levels of addition of Fat Substitute #2 to the cheese will vary with taste generally from about 10 to 30% by weight.

EXAMPLE 10

| Fat Substitute #3 | | |
|---|---|---|
| | | % |
| A. Potassium Sorbate | | 0.3 |
| Milk Pro 750 | | 11.5 |

-continued

| Fat Substitute #3 | | |
|---|---|---|
| | | % |
| *Satingel RH, **Gelcarin GP911 or ***Benegel WG 2000 (predominantly kappa carrageenan) | | 1.1 |
| Potassium chloride | | 1.6 |
| Water | | 85.5 |
| | Total | 100.00 |
| B. Potassium sorbate | | 0.3 |
| Xanthan | | 4.0 |
| Water | | 95.7 |
| | Total | 100.00 |

Products of:
*Sanofi Bio Ind.
**FMC Corp.
***Shemberg, USA

Procedure
1. Mix dry ingredients of A and then add the water indicated in A and blend to form a mixture. Heat the mixture to 170° F. and then cool to 40° F. with stirring to form A.
2. Mix B ingredients to form B.
3. Add 5 parts of A to 1 part of B and shear using procedure for Fat Substitute #1.
4. Add sufficient lactic acid (88% aqueous solution) to adjust the pH to 5.3.

EXAMPLE 11

A cheese-like product having cheddar-like characteristics can be made without fat or oil by using Fat Substitute #3 at about 25% by weight, that is, 1 part Fat Substitute #3 to 3 parts no-fat cheese cook which has the following composition.

| Cheese Cook: | |
|---|---|
| | % |
| (i) Flavor and Color | 2.00 |
| Caseine protein (milk) (85% concentration) | 23.50 |
| Whey protein (milk) (42% concentration) | 23.50 |
| Emulsifier salts (citrate and/or phosphate salts) | 2.00 |
| (ii) Water | 37.75 |
| (iii) Sorbic acid | 0.50 |
| Lactic acid (88% solution in water) | 1.00 |
| Salt | 2.25 |
| Water | 7.50 |
| | 100.00 |

Procedure
1. Blend (i) ingredients to form (i).
2. Add (ii) to cooker and heat while adding color and (i) to form a mixture. Cook the mixture at 180° F. until smooth.
3. Turn off heat and add (iii) with flavors.
4. Add Fat Substitute #3 (1 part per 3 parts of cheese cook) to cooker at 170° F. or lower.

5. Package at elevated temperature (while product is still flowable).

EXAMPLE 12

Fat Substitute #4

|   |   |   | % |
|---|---|---|---|
| A. | (i) | Milk Pro 750 | 10.00 |
|   | (ii) | Sugar | 57.00 |
|   |   | Benegel WG 2000 | 1.30 |
|   | (iii) | KCl | 0.60 |
|   | (iv) | Water | 31.10 |
|   |   |   | 100.00 |
| B. | Sorbo (70% Sorbitol Solution in water) | | 70.00 |
|   | Glycerine (95% solution in water) | | 30.00 |
|   |   |   | 100.00 |

Procedure:

Blend A's dry ingredients and disperse in the water indicated in A to form a mixture. Heat the mixture to 170° F. and cool with agitation to 40° F. Add A to B in a 4.7 to 1 ratio and then shear using procedure for Fat Substitute #1.

EXAMPLE 13

Fat Substitute #4 produces a high quality no-fat Butter Cream when used in the following recipe:

|   | Parts by Weight |
|---|---|
| Fat Substitute #4 | 43.00 |
| 10X powdered sugar | 55.50 |
| Vanilla | 1.50 |
| Butter Flavor | (q.s.) |

EXAMPLE 14

Fat Substitute #5

|   | % |
|---|---|
| Milk Pro 750 | 12.5 |
| Potassium Sorbate | 0.3 |
| Satingel RH | 1.0 |
| Viscarin SD389* | 0.2 |
| Sodium Citrate | 0.1 |
| KCl | 1.6 |
| Water | 84.3 |
|   | 100.00 |

*predominantly iota carrageenan or BENVISCO SI-80, product of SHEMBERG, USA

Procedure:

Blend dry ingredients and add to the water to form a mixture. Heat the mixture to 170° F. and then cool to 40° F. with agitation. Add about 5 parts of Fat Substitute #5 to about 1 part of clarified butter and then shear using procedure for Fat Substitute #1.

EXAMPLE 15

Fat Substitute #5 produces a high quality butter extender. Also it performs very well when used to produce butter creams.

What is claimed is:

1. A fat substitute comprising gel particles having a mean diameter particle size distribution in a dried state ranging from about 0.1 microns to about 2.0 microns, with less than about 2 percent of the total number of particles exceeding 3.0 microns in diameter wherein said gel particles comprise carrageenan and undenatured casein micelles.

2. A fat substitute according to claim 1, wherein said gel particles have encapsulated therein at least one soluble carbohydrate.

3. A fat substitute according to claim 1, wherein said carrageenan is at least one of kappa carrageenan, iota carrageenan and lambda carrageenan.

4. A fat substitute according to claim 1, wherein said gel particles comprise kappa carrageenan, undenatured casein micelles and locust bean gum.

5. A fat substitute according to claim 2, wherein said carrageenan is at least one of kappa carrageenan, iota carrageenan and lambda carrageenan.

6. A fat substitute according to claim 1, wherein said fat substitute is in dry powder form.

7. A fat substitute according to claim 1, wherein said fat substitute further comprises a blocking solution consisting essentially of at least one of water soluble carbohydrates and gums in water.

8. A fat substitute according to claim 1, wherein said fat substitute further comprises at least one oil as a blocking agent.

9. A food product having a pH of less than 5.6, wherein the food product contains a fat substitute according to claim 1.

10. A food product having a pH of less than 5.6, wherein the food product contains a fat substitute according to claim 2.

11. A food product containing a fat substitute according to claim 1.

12. A fat substitute according to claim 1 having a pH of less than 5.6.

13. A fat substitute according to claim 2 having a pH of less than 5.6.

14. A fat substitute according to claim 1, wherein said carrageenan is kappa carrageenan.

15. A fat substitute according to claim 1, wherein said carrageenan is iota carrageenan.

16. A fat substitute according to claim 1, wherein said carrageenan is a mixture of kappa and iota carrageenan.

17. A process for the production of a fat substitute, which consisting essentially of:

a) mixing carrageenan and undenatured complete milk protein into water;

b) heating the water to an elevated temperature while maintaining said mixing to dissolve the carrageenan and milk protein into the water so as to form a solution;

c) adding at least one cation to the solution;

d) cooling the solution from the elevated temperature to form a gel while maintaining said mixing; and e) subjecting the gel to shear to produce gel particles having a mean diameter particle size distribution in a dried state ranging from about 0.1 microns to about 2.0 microns, with less than about 2 percent of the total number of particles exceeding 3.0 microns in diameter.

18. A process according to claim 17, wherein said carrageenan is kappa carrageenan and said elevated temperature is about 130°–185° F.

19. A process according to claim 17, wherein said carrageenan is a mixture of kappa and iota carrageenan and said elevated temperature is about 130°–210° F.

20. A process according to claim 17, wherein said carrageenan is iota carrageenan and said elevated temperature is about 130°–210° F.

21. A process according to claim 17, wherein said carrageenan is lambda carrageenan and said elevated temperature is about 100°–140° F.

22. A process according to claim 17, wherein said carrageenan is kappa carrageenan and said elevated temperature is about 180°–185° F., further wherein at least one of locust bean gum and water soluble carbohydrate are added in step a) and mixed with the kappa carrageenan and milk protein.

23. A process according to claim 17, wherein a blocking solution is added to said gel after step d) but before said shearing in step e).

24. A process according to claim 23, wherein said blocking solution consists essentially of at least one of water soluble carbohydrates and gums in water.

25. A process according to claim 17, wherein at least one oil is added to said gel as a blocking agent after step d) but before said shearing in step e).

26. A process according to claim 22, wherein a blocking solution or blocking agent is added to said gel after step d) but before said shearing in step e).

27. A process according to claim 17, wherein said undenatured complete milk protein is supplied in the form of at least one of raw animal milk, pasteurized animal milk and defatted animal milk.

28. A process according to claim 17, wherein said undenatured complete milk protein is supplied in the form of at least one of dried raw animal milk, dried pasteurized animal milk and dried defatted animal milk.

* * * * *

UNITED STATES PATENT AND TRADEMARK OFFICE
CERTIFICATE OF CORRECTION

PATENT NO. : 5,458,904
DATED : October 17, 1995
INVENTOR(S) : John T. Zolper

It is certified that error appears in the above-identified patent and that said Letters Patent is hereby corrected as shown below:

Column 10, lines 1-10, the top of TABLE 1 is repeated. Column 10, lines 1-10 should be deleted.

Signed and Sealed this

Twenty-third Day of July, 1996

*Attest:*

BRUCE LEHMAN

*Attesting Officer*     Commissioner of Patents and Trademarks